United States Patent
Oshima et al.

(10) Patent No.: US 10,913,163 B2
(45) Date of Patent: Feb. 9, 2021

(54) METHOD OF OPENING AND CLOSING DOOR OF AUTOMOBILE BODY AND DOOR OPENING AND CLOSING ROBOT

(71) Applicant: KAWASAKI JUKOGYO KABUSHIKI KAISHA, Kobe (JP)

(72) Inventors: Takashi Oshima, Kakogawa (JP); Tomoyuki Nagao, Kobe (JP); Hideki Isoda, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/966,494

(22) PCT Filed: Nov. 8, 2019

(86) PCT No.: PCT/JP2019/043789
§ 371 (c)(1),
(2) Date: Jul. 31, 2020

(87) PCT Pub. No.: WO2020/096025
PCT Pub. Date: May 14, 2020

(65) Prior Publication Data
US 2021/0001494 A1    Jan. 7, 2021

(30) Foreign Application Priority Data
Nov. 9, 2018    (JP) .................................. 2018-211743

(51) Int. Cl.
*B25J 13/08*    (2006.01)
*B62D 65/02*    (2006.01)
(Continued)

(52) U.S. Cl.
CPC .......... *B25J 13/088* (2013.01); *B05B 12/124* (2013.01); *B05B 13/0228* (2013.01);
(Continued)

(58) Field of Classification Search
CPC ...... B62D 65/06; B62D 65/026; B25J 9/1674; B25J 13/088; B05B 13/02; B05B 13/0228; B05B 12/08; B05B 12/124
See application file for complete search history.

(56) References Cited

U.S. PATENT DOCUMENTS

| | | |
|---|---|---|
| 4,988,260 A | 1/1991 | Kiba et al. |
| 2009/0204260 A1* | 8/2009 | Bryne ................. B05B 13/0292 700/259 |
| 2017/0266808 A1 | 9/2017 | Alonso et al. |

FOREIGN PATENT DOCUMENTS

| | | |
|---|---|---|
| CN | 1788859 A | 6/2006 |
| CN | 107000211 A | 8/2017 |

(Continued)

OTHER PUBLICATIONS

Jan. 20, 2020 Written Opinion of the International Searching Authority issued in International Patent Application No. PCT/JP2019/04378.

*Primary Examiner* — Rachid Bendidi
(74) *Attorney, Agent, or Firm* — Oliff PLC

(57) ABSTRACT

A door opening and closing robot includes: a door operating tool including an insertion and restricting portion; a robotic arm that moves the door operating tool; and a control device that: operates the robotic arm, wherein the door operating tool moves to a first reference position, then moves toward a first presence confirmation position; obtains a position of the door operating tool as a first evaluation position; and determines a deviation between the first presence confirmation position and the first evaluation position, when the deviation is less than or equal to a predetermined first threshold, detects failed presence of the insertion portion in a window groove. The first reference position is the operating tool which is inserted in the window groove and the (Continued)

restricting portion is in contact with an edge of the window groove or positioned above the edge of the window groove.

8 Claims, 7 Drawing Sheets

(51) Int. Cl.
*B05B 12/12* (2006.01)
*B25J 9/16* (2006.01)
*B05B 13/02* (2006.01)
*B62D 65/06* (2006.01)

(52) U.S. Cl.
CPC .......... *B25J 9/1674* (2013.01); *B62D 65/026* (2013.01); *B62D 65/06* (2013.01)

(56) References Cited

FOREIGN PATENT DOCUMENTS

| | | |
|---|---:|---|
| DE | 3833105 A1 | 4/1989 |
| DE | 102014017855 A1 | 6/2016 |
| JP | S63-272677 A | 11/1988 |
| JP | H06-48336 A | 2/1994 |
| JP | 2512766 B2 | 7/1996 |
| JP | 2008-514504 A | 5/2008 |
| KR | 10-2017-0091630 A | 8/2017 |
| WO | 2006/035259 A1 | 4/2006 |
| WO | 2016/087042 A1 | 6/2016 |

\* cited by examiner

METHOD OF OPENING AND CLOSING DOOR OF AUTOMOBILE BODY AND DOOR OPENING AND CLOSING ROBOT

TECHNICAL FIELD

The present invention relates to a door opening and closing robot installed in an automobile body painting line, and to a method of opening and closing a door of an automobile body by using the door opening and closing robot.

BACKGROUND ART

Conventionally, the work of painting an automobile body has been performed by a painting robot. When automatically painting a door of the automobile body by the painting robot, it is necessary to open and close the door in order to paint the back of the door. The opening and closing of the door are performed by a painting robot having door opening and closing functions, or by a door opening and closing robot installed next to the painting robot.

Patent Literature 1 discloses a painting robot having functions of opening and closing a door of an automobile body. The robot includes, at the distal end portion of its robotic arm, a noncontact-type sensor such as an optical sensor and an engagement rod. In a state where the distal end portion of the robotic arm is brought close to the height of the upper edge of the door, the robot moves the robotic arm horizontally toward the door. When the noncontact-type sensor detects a particular shape that serves as a sign indicating the upper edge of the door, the robot inserts the engagement rod into the window groove of the door in accordance with the detection result. In a state where the engagement rod is inserted in the window groove of the door, the robot moves the robotic arm horizontally, thereby opening and closing the door.

Incidentally, an automotive painting line is set in an explosion-proof zone. In the explosion-proof zone, a mist of paint is floating in the air, and the value of electric current supplied to electrical equipment is limited so as not to cause sparks. Therefore, in the case of the robot of Patent Literature 1, there is a risk that the mist of paint adheres to the noncontact-type sensor, causing deterioration in detection performance of the sensor.

In view of this, Patent Literature 2 proposes disposing a door opening and closing robotic arm away from a painting robot and detecting the position of a door of an automobile body by using a noncontact-type distance sensor, such as an inductive sensor or a capacitive sensor, based on electromagnetic changes in electric and magnetic fields. The robotic arm of Patent Literature 2 includes three force sensors. Deflection of the robotic arm is detected by these force sensors, and positioning of a grip finger is performed in relation to the window groove of the door.

CITATION LIST

Patent Literature

PTL 1: Japanese Patent No. 2512766
PTL 2: Japanese Laid-Open Patent Application Publication No. 2008-514504

SUMMARY OF INVENTION

Technical Problem

In Patent Literature 2, the door opening and closing robotic arm is mounted with the three force sensors in addition to the noncontact-type distance sensor. This causes increase in the number of sensors and the number of components accompanying the sensors.

The present invention has been made in view of the above, and an object of the present invention is to propose a door opening and closing robot for performing door opening and closing operations with high reliability, yet with suppressed increase in the number of sensors, and to propose a method of opening and closing a door of an automobile body by using the door opening and closing robot.

Solution to Problem

A door opening and closing robot according to one aspect of the present invention is a door opening and closing robot for opening and closing a door of an automobile body. The door opening and closing robot includes: a door operating tool including an insertion portion and a restricting portion, the insertion portion being configured to be inserted in a window groove of the door, the restricting portion being configured to restrict movement of the insertion portion in an insertion direction toward the window groove by coming into contact with the door; a robotic arm that moves the door operating tool, the robotic arm including a plurality of connected links and drive units driving the respective links, the drive units including respective servomotors; and a control device. The control device: stores, as a first reference position, a position of the door operating tool at which the insertion portion is inserted in the window groove and the restricting portion is in contact with an edge of the window groove or positioned above the edge of the window groove when the door is at an open position or a closed position; stores, as a first presence confirmation position, a position of the door operating tool that is away from the first reference position in the insertion direction; operates the robotic arm, such that the door operating tool moves to the first reference position and then moves from the first reference position toward the first presence confirmation position; obtains, as a first evaluation position, a position of the door operating tool after operating the robotic arm; and determines a deviation between the first presence confirmation position and the first evaluation position, and if the deviation is less than or equal to a predetermined first threshold, detects failed presence of the insertion portion in the window groove. In the description herein, the insertion portion being present in the window groove means that the insertion portion of the door operating tool is properly inserted in the window groove, and that the door is properly held by the door operating tool. The term "failed presence" herein means that the insertion portion of the door operating tool is not inserted in the window groove, or that the insertion portion is inserted in the window groove but in an improper state. That is, the term "failed presence" herein means that the door is not properly held by the door operating tool.

In the above door opening and closing robot, the control device may be configured to: store, as a second reference position, a position of the door operating tool at which the insertion portion is inserted in the window groove when the door is at the open position or the closed position; store, as a second presence confirmation position, a position of the door operating tool that is horizontally away from the second reference position; operate the robotic arm such that the door operating tool moves to the second reference position and then moves from the second reference position toward the second presence confirmation position; obtain, as a second evaluation position, a position of the door operating tool after operating the robotic arm; and determine a deviation between the second presence confirmation position and the second evaluation position, and if the deviation is less than or equal to a predetermined second threshold, detect failed presence of the insertion portion in the window groove. In the above, when the door is at the open position, the second presence confirmation position is a position that is away from the second reference position in such a horizontal direction as to further open the door, and when the door is at the closed position, the second presence confirmation position is a position that is away from the second reference position in such a horizontal direction as to further close the door.

A method of opening and closing a door of an automobile body according to one aspect of the present invention is a method of opening and closing a door of an automobile body by using a door opening and closing robot, the robot including: a door operating tool including an insertion portion and a restricting portion; and a robotic arm that moves the door operating tool. The method includes: storing, as a first reference position, a position of the door operating tool at which the insertion portion is inserted in a window groove of the door and the restricting portion is in contact with an edge of the window groove or positioned above the edge of the window groove when the door is at an open position or a closed position; storing, as a first presence confirmation position, a position of the door operating tool that is away from the first reference position in a direction in which the insertion portion is inserted in the window groove; operating the robotic arm, such that the door operating tool moves to the first reference position and then moves from the first reference position toward the first presence confirmation position; obtaining, as a first evaluation position, a position of the door operating tool after operating the robotic arm; and determining a deviation between the first presence confirmation position and the first evaluation position, and if the deviation is less than or equal to a predetermined first threshold, detecting failed presence of the insertion portion in the window groove.

The above method of opening and closing the door of the automobile body may further include: storing, as a second reference position, a position of the door operating tool at which the insertion portion is inserted in the window groove when the door is at the open position or the closed position; storing, as a second presence confirmation position, a position of the door operating tool that is horizontally away from the second reference position; operating the robotic arm, such that the door operating tool moves to the second reference position and then moves from the second reference position toward the second presence confirmation position; obtaining, as a second evaluation position, a position of the door operating tool after operating the robotic arm; and determining a deviation between the second presence confirmation position and the second evaluation position, and if the deviation is less than or equal to a predetermined second threshold, detecting failed presence of the insertion portion in the window groove. In the above, when the door is at the open position, the second presence confirmation position is a position that is away from the second reference position in such a horizontal direction as to further open the door, and when the door is at the closed position, the second presence confirmation position is a position that is away from the second reference position in such a horizontal direction as to further close the door.

The above-described door opening and closing robot, and the above-described method of opening and closing the door of the automobile body by using the door opening and closing robot, are capable of detecting proper or failed presence of the insertion portion in the window groove based on the deviation between the first presence confirmation position and the first evaluation position (or based on the deviation between the second presence confirmation position and the second evaluation position). Then, after it is confirmed that there is no failed presence of the insertion portion in the window groove, the door operating tool can be moved in a direction to open, or in a direction to close, the door. The above presence confirmation positions (the first presence confirmation position and the second presence confirmation position) are predetermined positions, i.e., positions prestored in the control device. The above evaluation positions (the first evaluation position and the second evaluation position) can be obtained by using position control functions of the robotic arm of a general conventional robot. That is, neither special noncontact-type sensors nor special mechanical mechanisms are necessary for detecting the failed presence of the insertion portion of the door operating tool in the window groove. For these reasons, the above-described door opening and closing robot, and the above-described method of opening and closing the door of the automobile body by using the door opening and closing robot, make it possible to suppress increase in the number of sensors as compared to the techniques described in Patent Literatures 1 and 2.

Since optical sensors or the like are not used as described above, there is no risk of deterioration in the detection performance of the sensors due to the adhesion of the mist of paint thereto. Moreover, since no special mechanical mechanism is required as described above, there is no risk of malfunctioning of such mechanical mechanisms. Therefore, according to the above-described door opening and closing robot and the above-described method of opening and closing the door of the automobile body by using the door opening and closing robot, the door opening and closing robot can perform door opening and closing operations with high reliability.

Advantageous Effects of Invention

The present invention makes it possible to propose a door opening and closing robot for performing door opening and closing operations with high reliability, yet with suppressed increase in the number of sensors, and to propose a method of opening and closing a door of an automobile body by using the door opening and closing robot.

DESCRIPTION OF EMBODIMENTS

Figure 1:
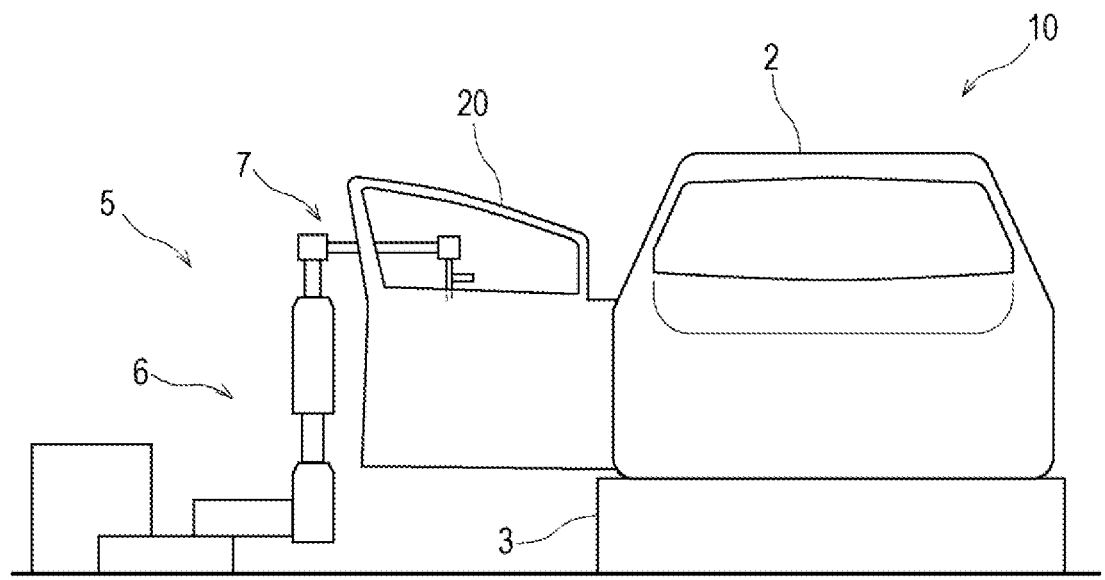
FIG. 1 shows a schematic configuration of a painting line of an automobile body according to one embodiment of the present invention.

Next, one embodiment of the present invention is described with reference to the drawings. FIG. 1 shows a schematic configuration of a painting line 10 of an automobile body 2 according to one embodiment of the present invention. The painting line 10 shown in FIG. 1 is equipped with a conveyor apparatus 3, which conveys the automobile body 2. A door opening and closing robot 5, which opens and closes a door 20 of the automobile body 2, is installed at the side of the conveyor apparatus 3. An unshown painting robot is installed in the painting line 10. The painting robot is mounted with a painting gun, and the automobile body 2 is subjected to coating with paint that is jetted out of the painting gun.

Figure 2:
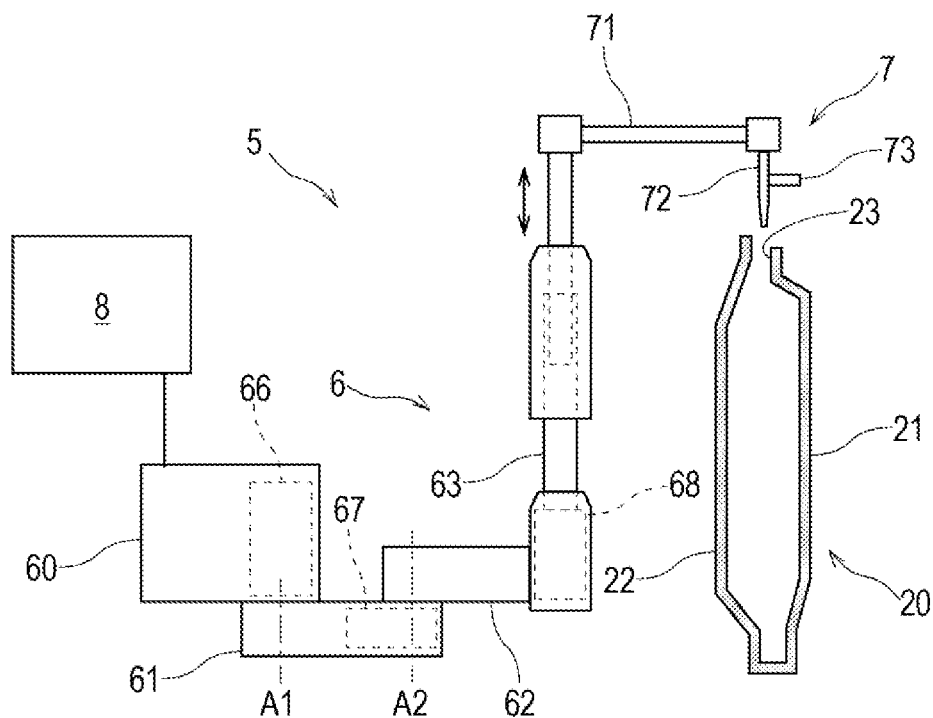
FIG. 2 shows a schematic configuration of a door opening and closing robot.
Figure 3:
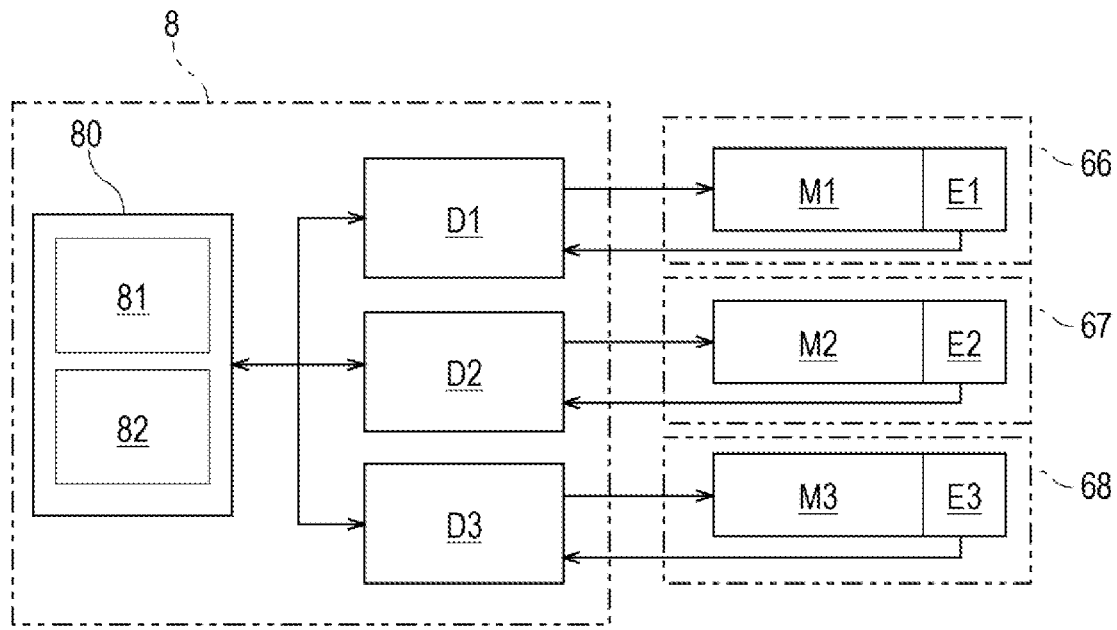
FIG. 3 shows the configuration of a control system of the door opening and closing robot.

FIG. 2 shows a schematic configuration of the door opening and closing robot 5 for opening the door 20. FIG. 3 shows the configuration of a control system of the door opening and closing robot 5. As shown in FIG. 2 and FIG. 3, the door opening and closing robot 5 includes: a door operating tool 7; a robotic arm 6, which moves the door operating tool 7; and a control device 8, which controls the operations of the robotic arm 6.

The robotic arm 6 according to the present embodiment is a three-axis horizontal articulated robotic arm. However, the configuration of the robotic arm 6 is not limited to the one described in the present embodiment. Alternatively, the robotic arm 6 may be a horizontal articulated robotic arm having a different number of axes, or may be a vertical articulated robotic arm.

The robotic arm 6 includes a base 60 and a plurality of connected links (a first link 61, a second link 62, and a third link 63). The base 60 may be installed on the floor. Alternatively, the base 60 may be mounted on a truck (not shown) that runs on rails extending parallel to the conveyor apparatus 3. The proximal end portion of the first link 61 is coupled to the base 60, such that the first link 61 is rotatable about a vertical first axis A1. The proximal end portion of the second link 62 is coupled to the distal end portion of the first link 61, such that the second link 62 is rotatable about a vertical second axis A2. The proximal end portion of the third link 63 is coupled to the distal end portion of the second link 62. The door operating tool 7 is coupled to the distal end portion of the third link 63, such that the door operating tool 7 can be lifted and lowered.

The door operating tool 7 includes an arm 71, an insertion portion 72, and a restricting portion 73, which are integrated together. The arm 71 is L-shaped, and the proximal end portion of the arm 71 is coupled to the third link 63. The insertion portion 72 is rod-shaped (or pin-shaped), extends vertically, and is fixed to the distal end portion of the arm 71. The restricting portion 73 is a projection piece, which projects horizontally from a non-end part of the insertion portion 72 in the vertical direction.

The door 20 includes an inner panel 21 and an outer panel 22, which are spaced apart from and face each other. A window groove 23, in which window glass is to be inserted, is formed between the inner panel 21 and the outer panel 22. The window groove 23 is a slit that is open upward. The insertion portion 72 of the door operating tool 7 is insertable in the window groove 23. When the insertion portion 72 inserted in the window groove 23 further moves in the insertion direction, the restricting portion 73 comes into contact with the inner panel 21 (or the outer panel 22) of the door 20, thereby restricting further movement, in the insertion direction, of the entire door operating tool 7 including the insertion portion 72.

The robotic arm 6 further includes: a first drive unit 66, which drives the first link 61 to rotate about the first axis A1; a second drive unit 67, which drives the second link 62 to rotate about the second axis A2; and a third drive unit 68, which drives the door operating tool 7 to be lifted and lowered relative to the third link 63.

The first drive unit 66 includes: a servomotor M1; a transmission mechanism (not shown) that transmits the rotational output of the output shaft of the servomotor M1 to the first link 61; and a rotational position sensor E1, which detects the rotational angle of the output shaft of the servomotor M1. The transmission mechanism may include, for example, a gear train and a transmission belt. The rotational position sensor E1 may be, for example, a rotary encoder. The first drive unit 66 may be provided inside the base 60.

The second drive unit 67 includes: a servomotor M2; a transmission mechanism (not shown) that transmits the rotational output of the output shaft of the servomotor M2 to the second link 62; and a rotational position sensor E2, which detects the rotational angle of the output shaft of the servomotor M2. The transmission mechanism may include, for example, a gear train and a transmission belt. The rotational position sensor E2 may be, for example, a rotary encoder. The second drive unit 67 may be provided inside the first link 61 or inside the base 60.

The third drive unit 68 includes: a servomotor M3; a transmission mechanism (not shown) that converts the rotational output of the output shaft of the servomotor M3 into linear motion of the door operating tool 7; and a rotational position sensor E3, which detects the rotational angle of the output shaft of the servomotor M3. The transmission mechanism may include, for example, a ball screw mechanism. The rotational position sensor E3 may be, for example, a rotary encoder. The third drive unit 68 may be provided inside the third link 63 or inside the base 60.

Operations of the first to third drive units 66, 67, and 68 are controlled by the control device 8. The control device 8 includes: servo drivers D1 to D3 corresponding to the servomotors M1 to M3, respectively; and a controller 80. The servo drivers D1 to D3 control the driving of the respective servomotors M1 to M3, such that each of the controlled servomotors M1 to M3 follows a position command signal generated by the controller 80. The rotational position sensors E1 to E3 transmit, as feedback, parameter signals relating to the operations of the corresponding servomotors M1 to M3 to the corresponding servo drivers D1 to D3. The parameter signals transmitted as feedback (hereinafter, "feedback signals") contain, for example, information about the rotational positions (angles) of the output shafts of the servomotors M1 to M3 and information about the rotational speeds of the output shafts of the servomotors M1 to M3.

Based on the position command signal from the controller 80 and the feedback signal from the rotational position sensor E1, the servo driver D1 for the first drive unit 66 calculates a command value relating to the operation of the servomotor M1, and supplies a driving current to the servomotor M1 so that the operation of the servomotor M1 will follow the command value. The same is true of the servo driver D2 for the second drive unit 67 and the servo driver D3 for the third drive unit 68.

Figure 4:
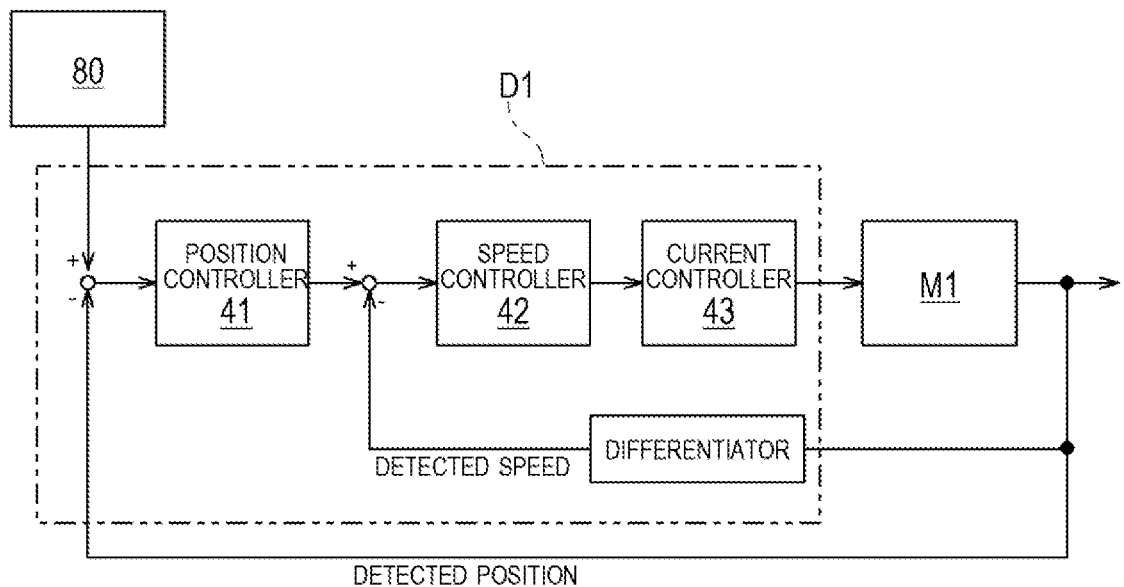
FIG. 4 is a block diagram showing a servo control structure of a servo driver for a first drive unit.

Hereinafter, the servo control structure of the servo driver D1 for the first drive unit 66 is described with reference to FIG. 4. FIG. 4 is a block diagram showing the servo control structure of the servo driver D1 for the first drive unit 66. Since each of the servo driver D2 for the second drive unit 67 and the servo driver D3 for the third drive unit 68 has the same servo control structure as that of the servo driver D1 for the first drive unit 66, the description of the servo control structures of the servo drivers D2 and D3 is omitted.

The servo driver D1 includes a position controller 41, a speed controller 42, and a current controller 43. The position controller 41 multiplies a positional deviation by a predetermined position loop proportional gain, the positional deviation being a deviation between a position command from the controller 80 and a position detected by the rotational position sensor E1, thereby calculating a speed command. The speed controller 42 performs a calculation of multiplying an integration amount of a speed deviation by a predetermined speed loop integral gain, the speed deviation being a deviation between the speed command calculated by the position controller 41 and a detected speed. Then, the speed controller 42 multiplies the sum of the calculation result and the speed deviation by a predetermined speed loop proportional gain, thereby calculating a torque command. The current controller 43 outputs an electric current command based on the torque command calculated by the speed controller 42, and in accordance with the electric current command, the driving of the servomotor M1 is controlled. The current controller 43 includes a filter relating to the torque command (a first order low-pass filter) and at least one notch filter. It should be noted that the above-described servo control structure is merely one example of a control structure adoptable by the servo driver D1. Any known servo control structure may be adopted as the servo control structure of each of the servo drivers D1 to D3.

The controller 80 is a computer including a CPU 81 and memories 82, such as a ROM and RAM. The memories 82 store therein, for example, programs executed by the CPU 81 and various fixed data. The CPU 81 transmits and receives data to and from external devices. The CPU 81 receives detection signals inputted from various sensors, and outputs control signals to respective control targets. The controller 80 performs processes for controlling the operation of the robotic arm 6 by reading out and executing software, such as the programs stored in the memories 82, by the CPU 81. It should be noted that the controller 80 may be configured as a single computer performing the processes by centralized control, or may be configured as a plurality of computers performing distributed control in cooperation with each other, thereby performing the processes. The controller 80 may be configured as, for example, a microcontroller or a programmable logic controller (PLC).

Figure 5:
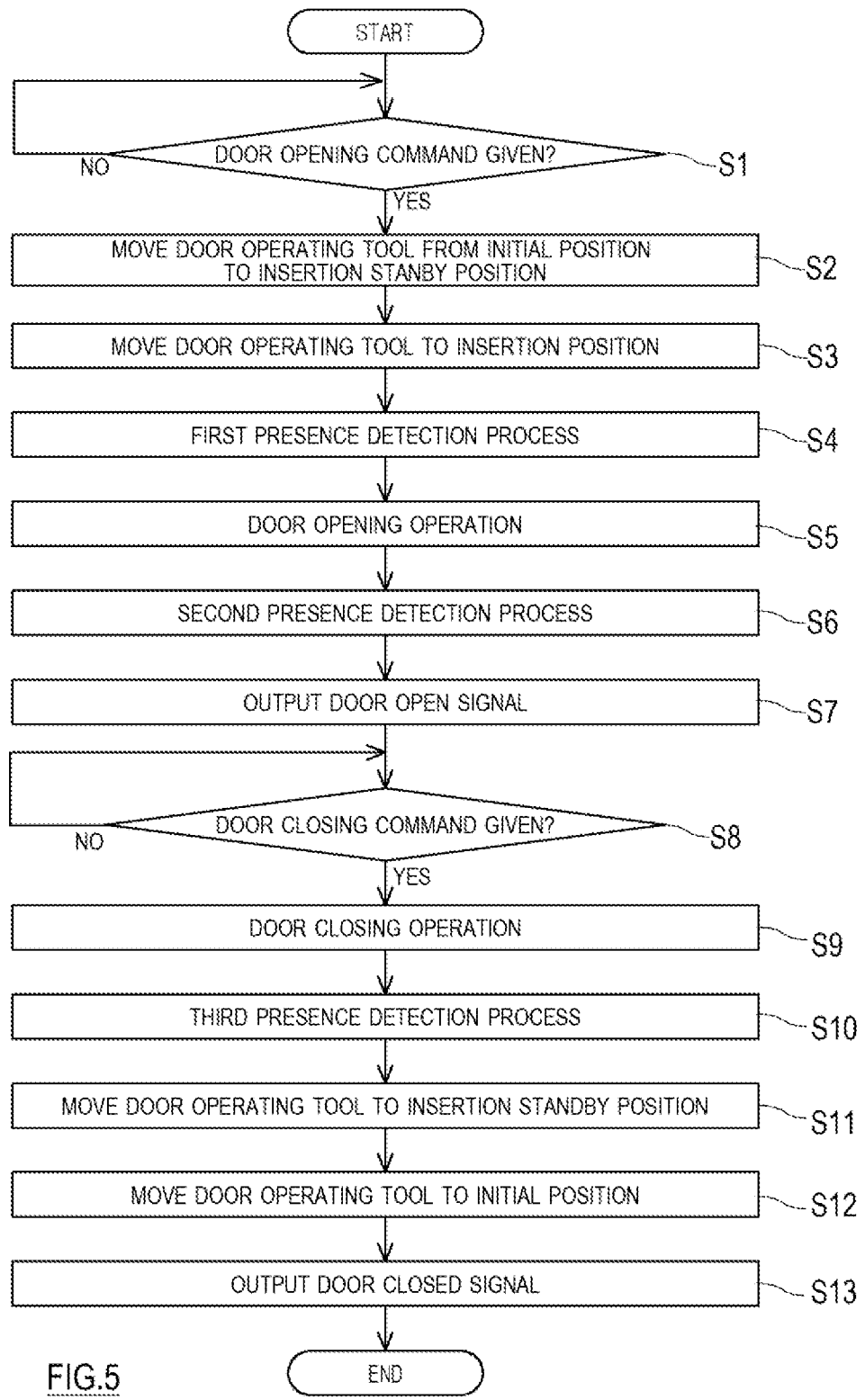
FIG. 5 is a flowchart of door opening and closing processes performed by a control device.

Hereinafter, operations of opening and closing the door 20 by the door opening and closing robot 5 are described. FIG. 5 is a flowchart of door opening and closing processes performed by the control device 8.

As shown in FIG. 5, upon receiving a door opening command (YES in step S1), the control device 8 operates the robotic arm 6, such that the door operating tool 7 moves from an initial position to an insertion standby position (see FIG. 2) (step S2). The door opening command is outputted to the control device 8 from the painting robot or from a different computer via wired or wireless communication means.

The initial position of the door operating tool 7 is a position where the door opening and closing robot 5 does not interfere with the automobile body 2 conveyed by the conveyor apparatus 3. The initial position is taught to the door opening and closing robot 5 in advance, and is stored in the control device 8. As shown in FIG. 2, when the door operating tool 7 is at the insertion standby position, the insertion portion 72 is positioned above the window groove 23 of the door 20. The insertion standby position is taught to the door opening and closing robot 5 in advance, and is stored in the control device 8.

Figure 7:
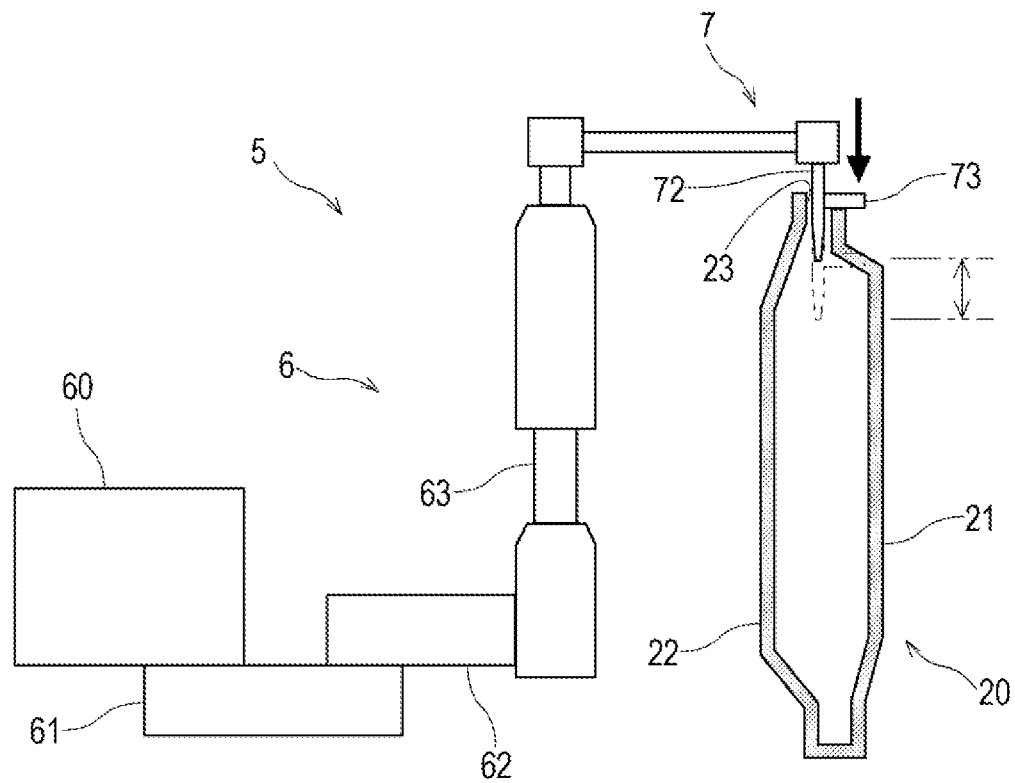
FIG. 7 is a side view of the door opening and closing robot, the side view showing a door operating tool at an insertion position.

When the door operating tool 7 has moved to the insertion standby position, the control device 8 operates the robotic arm 6, such that the door operating tool 7 is lowered from the insertion standby position and moves to an insertion position (see FIG. 7) (step S3). As shown in FIG. 7, when the door operating tool 7 is at the insertion position, ideally, the insertion portion 72 is inserted in the window groove 23 of the door 20, and the restricting portion 73 is in contact with the edge of the window groove 23. The insertion position is taught to the door opening and closing robot 5 in advance, and is stored in the control device 8. It should be noted that when the moving of the door operating tool 7 to the stored insertion position is completed, the actual position of the door operating tool 7 is not necessarily the same as the stored insertion position. Also, when the moving of the door operating tool 7 to the insertion position is completed, the insertion portion 72 of the door operating tool 7 is not necessarily present in the window groove 23. If there is an axial displacement of the robotic arm 6, or if the position of the door 20 or the position of the automobile body 2 is displaced from a predetermined position, then even when the moving of the door operating tool 7 to the insertion position is completed, the insertion portion 72 of the door operating tool 7 may not be present in the window groove 23.

When the door operating tool 7 has moved to the insertion position, the control device 8 starts a first presence detection process (step S4). The first presence detection process is a process of detecting, when the door operating tool 7 is at the insertion position, that the insertion portion 72 is present in the window groove 23. In the description herein, the insertion portion 72 being present in the window groove 23 means that the insertion portion 72 is properly inserted in the window groove 23.

Figure 6:
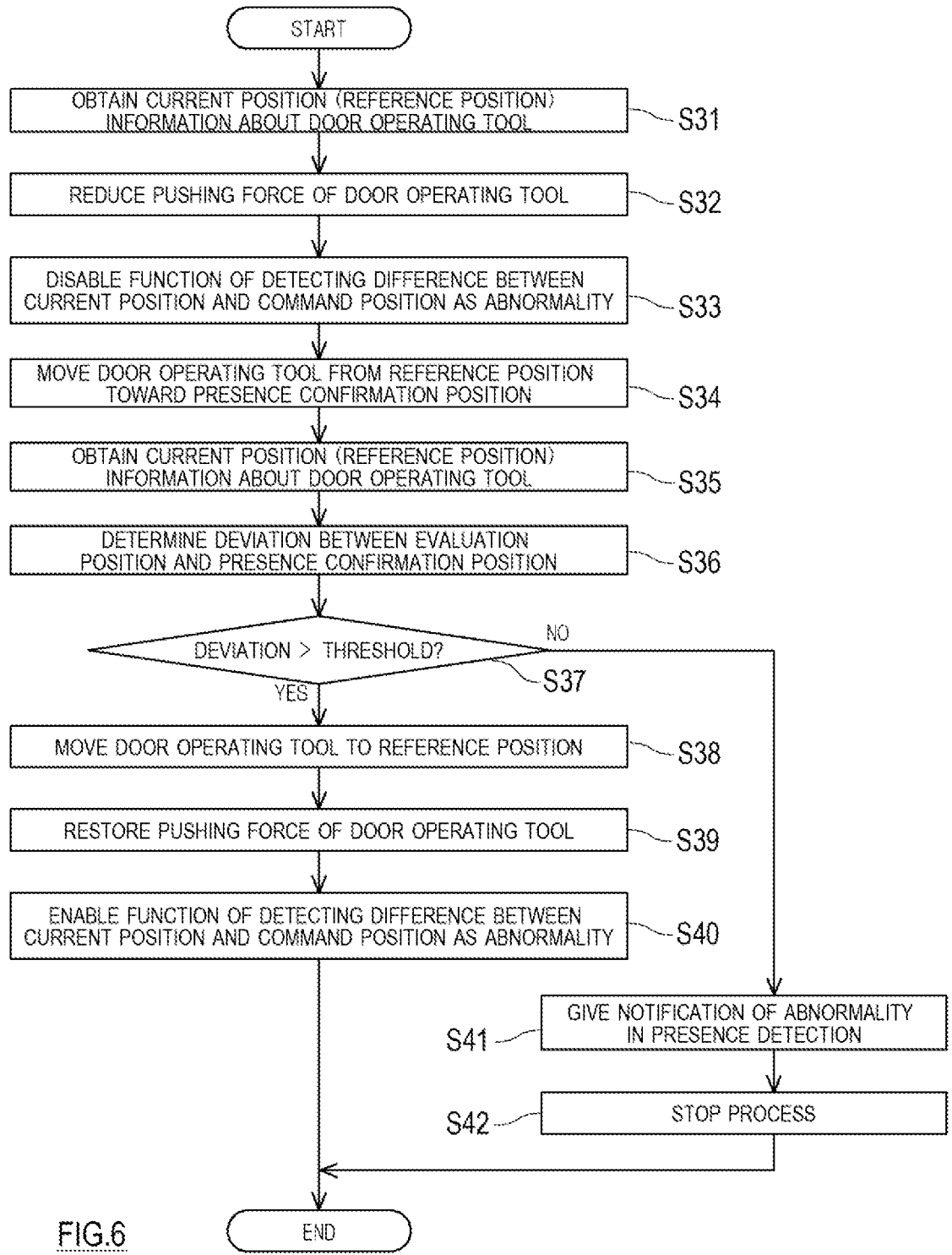
FIG. 6 is a flowchart of a presence detection process performed by the control device.

FIG. 6 is a flowchart of the presence detection process performed by the control device 8. As shown in FIG. 6, the control device 8 obtains current position information about the door operating tool 7 (step S31), and stores the obtained current position as a "reference position". The current position of the door operating tool 7 is the current position of a predetermined reference point set on the robotic arm 6 or the door operating tool 7. The current position of the door operating tool 7 can be determined from the pose (i.e., position and posture) of the robotic arm 6, the pose being derived from detection values detected by the rotational position sensors E1 to E3.

Next, the control device 8 reduces the pushing force of the door operating tool 7 (step S32). In a case where the door operating tool 7 comes into contact with an object and thereby receives external force, generally speaking, the door opening and closing robot 5 stops in a state where the pushing force of the door operating tool 7 and the external force are equal to each other. At the time, if the stiffness of the robotic arm 6 is high, great reaction force occurs, causing a risk that the object may get damaged. In this respect, in a case where the door operating tool 7 comes into contact with the door 20 and thereby receives external force, damage to the door 20 and the door operating tool 7 can be avoided by lowering the stiffness of the robotic arm 6 and reducing the pushing force of the door operating tool 7.

In order to reduce the pushing force of the door operating tool 7, the control device 8 reduces a servo gain to be lower than when a normal operation (i.e., a painting operation) is performed. As a result, the responsiveness of the robotic arm 6 is lowered, and the robotic arm 6 becomes more reactive to the external force. The adjustment (reduction) of the servo gain includes speed loop adjustment. The speed loop adjustment includes the adjustment of at least one of the speed loop proportional gain and the speed loop integral gain (speed loop integration time constant). If the adjustment of only the speed loop proportional gain and the speed loop integral gain is insufficient to adjust the servo gain, a current loop command filter may also be adjusted. The adjustment of the servo gain may further include position loop adjustment. The position loop adjustment includes the adjustment of the position loop proportional gain. A servo gain adjustment (reduction) method used for reducing the pushing force of the door operating tool 7 is prestored in the control device 8. As one example of the adjustment method, the speed loop integral gain is adjusted to zero, and each of the speed loop proportional gain and the position loop proportional gain is multiplied by a multiplying factor of less than 1. It should be noted that the method of reducing the pushing force of the door operating tool 7 is not limited to the reduction of the servo gain. For example, the control device 8 may limit the upper limit value of the electric current supplied to each of the servomotors M1 to M3 to be lower than when a normal operation (i.e., a painting operation) is performed, and thereby the pushing force of the door operating tool 7 may be reduced.

Next, the control device 8 disables a function of detecting, as an abnormality, a difference between the current position of the door operating tool 7 and a command position (step S33).

Then, the control device 8 operates the robotic arm 6, such that the door operating tool 7 moves from the current position (reference position) toward a presence confirmation position (step S34). The presence confirmation position is taught to the door opening and closing robot 5 in advance, and is stored in the control device 8. In FIG. 7, the presence confirmation position indicated by two-dot chain line is, in the vertical direction, positioned below the insertion position of the door operating tool 7. Accordingly, as a result of operating the robotic arm 6 to move the door operating tool 7 from the reference position toward the presence confirmation position, the restricting portion 73 of the door operating tool 7 is caused to move in such a manner as to push the edge of the window groove 23 of the door 20 downward.

When the door operating tool 7 is at the insertion position, if the insertion portion 72 is present in the window groove 23 and the restricting portion 73 is in contact with the edge of the window groove 23 of the door 20, i.e., ideal state, then even if the robotic arm 6 is operated so as to move the door operating tool 7 from the insertion position toward the presence confirmation position, the door operating tool 7 cannot move. On the other hand, when the door operating tool 7 is at the insertion position, if the insertion portion 72 is not yet inserted in the window groove 23, then the movement of the door operating tool 7 is not prevented by the edge of the window groove 23 of the door 20.

When a predetermined time has elapsed after starting operating the robotic arm 6, the control device 8 obtains current position information about the door operating tool 7 (step S35), and stores the obtained current position as an "evaluation position". The control device 8 further determines a deviation between the evaluation position and the presence confirmation position (step S36). The control device 8 compares the determined deviation with a prestored threshold. If the deviation is greater than the threshold, it means that the door operating tool 7 has almost not moved downward from the reference position. On the other hand, if the deviation is less than or equal to the threshold, it means that the door operating tool 7 has moved downward from the reference position. If the deviation is greater than the threshold (YES in step S37), the control device 8 determines that the insertion portion 72 of the door operating tool 7 has been confirmed to be present in the window groove 23.

When the insertion portion 72 has been confirmed to be present in the window groove 23, the control device 8 causes the door operating tool 7 to return to the reference position (step S38), restores the pushing force of the door operating tool 7 (step S39), enables the function of detecting, as an abnormality, a difference between the current position of the door operating tool 7 and the command position, and ends the first presence detection process.

On the other hand, when the control device 8 compares the determined deviation and the prestored threshold, if the deviation is less than or equal to the threshold (NO in step S37), the control device 8 detects failed presence of the insertion portion 72 of the door operating tool 7 in the window groove 23 (in this example, failed presence at the insertion position). The the term "failed presence" herein means that the insertion portion 72 is not inserted in the window groove 23, or that the insertion portion 72 is inserted in the window groove 23 but in an improper state. The above threshold is set to a suitable position by taking into consideration, for example, the following factors: the insertion portion 72 is allowed to move slightly inside the window groove 23; and detection errors of the rotational position sensors E1 to E3. If the failed presence of the door operating tool 7 is detected, the control device 8 gives a notification that there is an abnormality in presence detection (step S41), and stops the door opening and closing processes of the door opening and closing robot 5 (step S42). It should be noted that, in step S42, the control device 8 may stop the door opening and closing robot 5 from operating.

Figure 8:
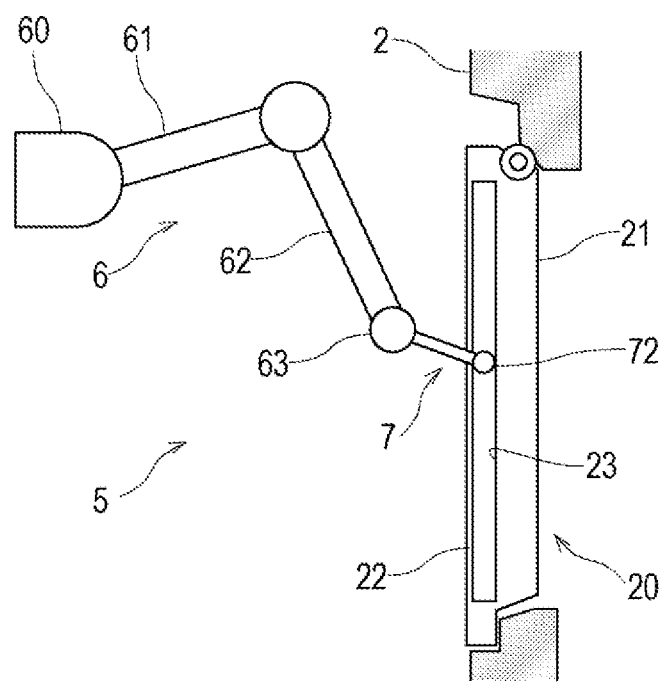
FIG. 8 is a plan view of the door opening and closing robot, the plan view showing the door operating tool at a door closed position.
Figure 9:
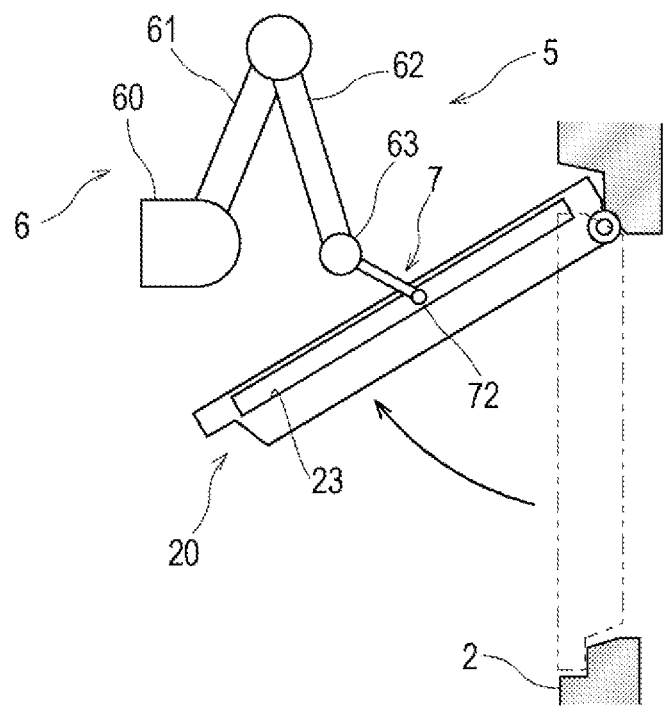
FIG. 9 is a plan view of the door opening and closing robot, the plan view showing the door operating tool at a door open position.

When the first presence detection process ends, the control device 8 causes the robotic arm 6 to perform an operation of opening the door 20 (step S5). Specifically, the control device 8 operates the robotic arm 6, such that the door operating tool 7 moves from the insertion position (see FIG. 8) to a door open position (see FIG. 9). The door open position is taught to the door opening and closing robot 5 in advance, and is stored in the control device 8.

When the door operating tool 7 has moved to the door open position, the control device 8 starts a second presence detection process (step S6). The second presence detection process is a process of detecting, when the door operating tool 7 is at the door open position, that the insertion portion 72 is present in the window groove 23.

Figure 10:
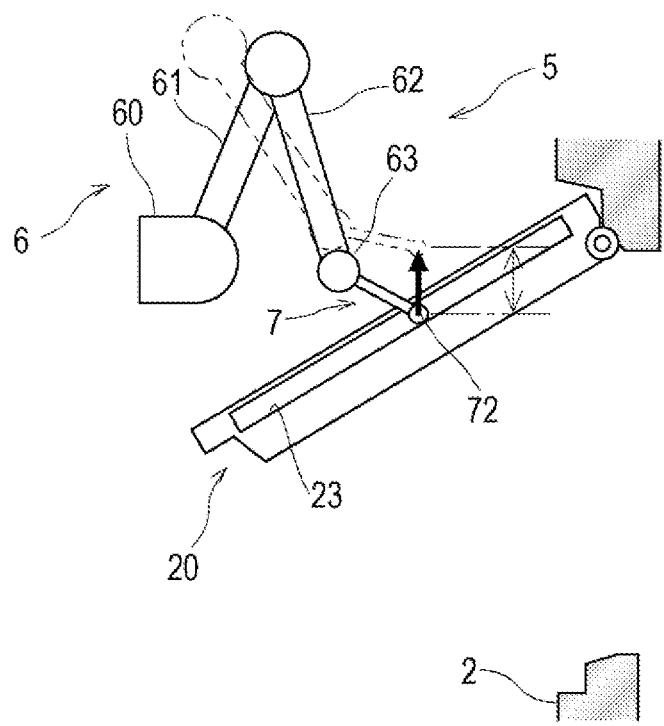
FIG. 10 is a plan view of the door opening and closing robot, the plan view showing a presence confirmation position in a second presence detection process.

The second presence detection process performed by the control device 8 is substantially the same as the above-described first presence detection process (steps S31 to S42). However, in the second presence detection process, the "reference position" in step S31 corresponds to the door open position. Also, in the second presence detection process, the "presence confirmation position" in step S34 is, as indicated by two-dot chain line in FIG. 10, a position to which the door operating tool 7 is moved horizontally from the door open position in such a direction as to further open the door 20.

When the second presence detection process ends, the control device 8 outputs a door open signal to the painting robot or to a different computer via wired or wireless communication means (step S7). When the opening of the door 20 is thus completed, the painting robot performs painting of the door 20.

Upon obtaining a door closing command (YES in step S8), the control device 8 causes the robotic arm 6 to perform an operation of closing the door 20 (step S9). The door closing command is outputted to the control device 8 from the painting robot or from a different computer via wired or wireless communication means. The control device 8 operates the robotic arm 6, such that the door operating tool 7 moves from the door open position (see FIG. 9) to a door closed position (see FIG. 8). The door closed position is taught to the door opening and closing robot 5 in advance, and is stored in the control device 8.

When the door operating tool 7 has moved to the door closed position, the control device 8 starts a third presence detection process (step S10). The third presence detection process is a process of detecting, when the door operating tool 7 is at the door closed position, that the insertion portion 72 is present in the window groove 23.

Figure 11:
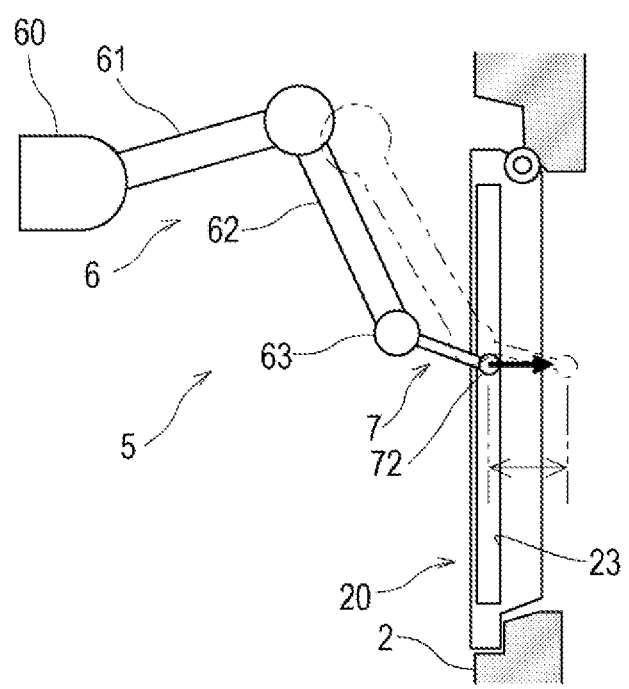
FIG. 11 is a plan view of the door opening and closing robot, the plan view showing a presence confirmation position in a third presence detection process.

The third presence detection process performed by the control device 8 is substantially the same as the above-described first presence detection process (steps S31 to S42). However, in the third presence detection process, the "reference position" in step S31 corresponds to the door closed position. Also, in the third presence detection process, the "presence confirmation position" in step S34 is, as indicated by two-dot chain line in FIG. 11, a position to which the door operating tool 7 is moved horizontally from the door closed position in such a direction as to further close the door 20.

When the third presence detection process ends, the control device 8 operates the robotic arm 6, such that the door operating tool 7 moves to the insertion standby position (see FIG. 2) (step S11). The control device 8 further operates the robotic arm 6, such that the door operating tool 7 moves to the initial position (step S12). Finally, the control device 8 outputs a door closed signal to the painting robot or to a different computer via wired or wireless communication means (step S13), and ends the door opening and closing processes.

In the above-described door opening and closing processes, in the first presence detection process, the presence confirmation position is set as a position that is away in the insertion direction (i.e., downward) from the reference position. Further, in the second presence detection process, the presence confirmation position is set as a position that is away from the reference position in such a horizontal direction as to further open the door. Still further, in the third presence detection process, the presence confirmation position is set as a position that is away from the reference position in such a horizontal direction as to further close the door. However, the combination of the presence confirmation positions in the first to third presence detection processes is not limited to the above. For example, the combination of the presence confirmation positions in the first to third presence detection processes can be selected from among combination options 1 to 7 in Table 1 below.

TABLE 1

|  | First presence detection process | Second presence detection process | Third presence detection process |
| --- | --- | --- | --- |
| Option 1 | A | B | C |
| Option 2 | A | A | C |
| Option 3 | A | B | A |
| Option 4 | A | A | A |
| Option 5 | C | A | A |
| Option 6 | C | A | C |
| Option 7 | C | B | A |

A: The presence confirmation position is away downward from the reference position.
B: The presence confirmation position is away from the reference position in such a horizontal direction as to further open the door.
C: The presence confirmation position is away from the reference position in such a horizontal direction as to further close the door.

In the above-described door opening and closing processes, when the door operating tool 7 is at the insertion position, the door open position, or the door closed position, ideally, the insertion portion 72 is inserted in the window groove 23, and the restricting portion 73 is in contact with the edge of the window groove 23. However, when the door operating tool 7 is at the insertion position, the door open position, or the door closed position, the restricting portion 73 need not be in contact with the edge of the window groove 23, and may be positioned above the edge of the window groove 23. In this case, the distance between the restricting portion 73 and the edge of the window groove 23 is less than the distance between the insertion position and the presence confirmation position in the first presence detection process. For example, even though the restricting portion 73 is positioned above the edge of the window groove 23 when the door operating tool 7 is at the insertion position, while the door operating tool 7 is moving from the reference position (the insertion position) toward the presence confirmation position, the downward movement of the restricting portion 73 becomes restricted, and as a result, it can be detected that the restricting portion 73 has come into contact with the edge of the window groove 23. That is, it can be detected that the insertion portion 72 of the door operating tool 7 is present in the window groove 23.

As described above, the door opening and closing robot 5 according to the present embodiment includes: the door operating tool 7 including the insertion portion 72 and the restricting portion 73, the insertion portion 72 being configured to be inserted in the window groove 23 of the door 20, the restricting portion 73 being configured to restrict the movement of the insertion portion 72 in the insertion direction toward the window groove 23 by coming into contact with the door 20; the robotic arm 6, which moves the door operating tool 7, the robotic arm 6 including the plurality of connected links 61, 62, and 63 and the drive units 66, 67, and 68 driving the respective links 61, 62, and 63, the drive units 66 to 68 including the respective servomotors M1 to M3; and the control device 8. The control device 8 stores, as a first reference position, the position of the door operating tool 7 at which the insertion portion 72 is inserted in the window groove 23 and the restricting portion 73 is in contact with the edge of the window groove 23 or positioned above the edge of the window groove 23 when the door 20 is at the open position or the closed position. The control device 8 stores, as a first presence confirmation position, the position of the door operating tool 7 that is away from the first reference position in the insertion direction. The control device 8 operates the robotic arm 6, such that the door operating tool 7 moves to the first reference position and then moves from the first reference position toward the first presence confirmation position. The control device 8 obtains, as a first evaluation position, the position of the door operating tool 7 after operating the robotic arm 6. The control device 8 determines a deviation between the first presence confirmation position and the first evaluation position, and if the deviation is less than or equal to a predetermined first threshold, detects failed presence of the insertion portion 72 in the window groove 23.

In the door opening and closing robot 5 according to the present embodiment, the control device 8 stores, as a second reference position, the position of the door operating tool 7 at which the insertion portion 72 is inserted in the window groove 23 when the door 20 is at the open position or the closed position. The control device 8 stores, as a second presence confirmation position, the position of the door operating tool 7 that is horizontally away from the second reference position. The control device 8 operates the robotic arm 6, such that the door operating tool 7 moves to the second reference position and then moves from the second reference position toward the predetermined second presence confirmation position. The control device 8 obtains, as a second evaluation position, the position of the door operating tool 7 after operating the robotic arm 6. The control device 8 determines a deviation between the second presence confirmation position and the second evaluation position, and if the deviation is less than or equal to a predetermined second threshold, detects failed presence of the insertion portion 72 in the window groove 23. In the above, when the door 20 is at the open position, the second presence confirmation position is a position that is away from the second reference position in such a horizontal direction as to further open the door 20. When the door 20 is at the closed position, the second presence confirmation position is a position that is away from the second reference position in such a horizontal direction as to further close the door 20.

The method of opening and closing the door of the automobile body 2 according to the present embodiment, the method using the above-described door opening and closing robot 5, includes: storing, as the first reference position, the position of the door operating tool 7 at which the insertion portion 72 is inserted in the window groove 23 of the door 20 and the restricting portion 73 is in contact with the edge of the window groove 23 or positioned above the edge of the window groove 23 when the door 20 is at the open position or the closed position; storing, as the first presence confirmation position, the position of the door operating tool 7 that is away from the first reference position in the direction in which the insertion portion 72 is inserted in the window groove 23; operating the robotic arm 6, such that the door operating tool 7 moves to the first reference position and then moves from the first reference position toward the first presence confirmation position; obtaining, as a first evaluation position, the position of the door operating tool 7 after operating the robotic arm 6; and determining a deviation between the first presence confirmation position and the first evaluation position, and if the deviation is less than or equal to the predetermined first threshold, detecting failed presence of the insertion portion 72 in the window groove 23.

The above method of opening and closing the door of the automobile body 2 includes: storing, as the second reference position, the position of the door operating tool 7 at which the insertion portion 72 is inserted in the window groove 23 when the door 20 is at the open position or the closed position; storing, as the second presence confirmation position, the position of the door operating tool 7 that is horizontally away from the second reference position; operating the robotic arm 6, such that the door operating tool 7 moves to the second reference position and then moves from the second reference position toward the predetermined second presence confirmation position; obtaining, as the second evaluation position, the position of the door operating tool 7 after operating the robotic arm 6; and determining a deviation between the second presence confirmation position and the second evaluation position, and if the deviation is less than or equal to the predetermined second threshold, detecting failed presence of the insertion portion 72 in the window groove 23.

The above-described door opening and closing robot 5, and the above-described method of opening and closing the door of the automobile body 2 by using the door opening and closing robot 5, are capable of detecting proper or failed presence of the insertion portion 72 in the window groove 23 based on the deviation between the first presence confirmation position and the first evaluation position (or based on the deviation between the second presence confirmation position and the second evaluation position). Then, after it is confirmed that there is no failed presence of the insertion portion 72 in the window groove 23, the door operating tool 7 can be moved in a direction to open, or in a direction to close, the door 20. The above presence confirmation positions (the first presence confirmation position and the second presence confirmation position) are predetermined positions, i.e., positions prestored in the control device 8. The above evaluation positions (the first evaluation position and the second evaluation position) can be obtained by using position control functions of the robotic arm 6 of a general conventional robot. That is, neither special noncontact-type sensors nor special mechanical mechanisms are necessary for detecting the failed presence of the insertion portion 72 of the door operating tool 7 in the window groove 23. For these reasons, the above-described door opening and closing robot 5, and the above-described method of opening and closing the door of the automobile body 2 by using the door opening and closing robot 5, make it possible to suppress increase in the number of sensors as compared to the techniques described in Patent Literatures 1 and 2.

Since optical sensors or the like are not used as described above, there is no risk of deterioration in the detection performance of the sensors due to the adhesion of the mist of paint thereto. Moreover, since no special mechanical mechanism is required as described above, there is no risk of malfunctioning of such mechanical mechanisms. Therefore, according to the above-described door opening and closing robot 5 and the above-described method of opening and closing the door of the automobile body 2 by using the door opening and closing robot 5, the door opening and closing robot 5 can perform door opening and closing operations with high reliability.

In the door opening and closing robot 5, and the method of opening and closing the door of the automobile body 2 by using the door opening and closing robot 5, according to the present embodiment, after operating the robotic arm 6 such that the door operating tool 7 moves to the first reference position, but before operating the robotic arm 6 such that the door operating tool 7 moves from the first reference position toward the first presence confirmation position, the pressing force applied from the door operating tool 7 to the door 20 is reduced.

Similarly, in the door opening and closing robot 5, and the method of opening and closing the door of the automobile body 2 by using the door opening and closing robot 5, according to the present embodiment, after operating the robotic arm 6 such that the door operating tool 7 moves to the second reference position, but before operating the robotic arm 6 such that the door operating tool 7 moves from the second reference position toward the second presence confirmation position, the pressing force applied from the door operating tool 7 to the door 20 is reduced.

When the door operating tool 7 comes into contact with the door 20 and thereby receives external force, if the stiffness of the robotic arm 6 is high, great reaction force occurs, causing a risk that the door 20 or the door operating tool 7 may get damaged. In this respect, by reducing the pressing force applied from the door operating tool 7 to the door 20 as described above, damage to the door 20 and the door operating tool 7 can be avoided.

Although the preferred embodiment of the present invention is as described above, specific structural and/or functional details of the above-described embodiment can be modified without departing from the spirit of the present invention, and such modifications would fall within the scope of the present invention. The above-described configurations can be modified, for example, as described below.

For instance, in the above-described embodiment, the door opening and closing robot 5 is a different robot from the painting robot; however, the painting robot may also have functions as the door opening and closing robot 5. In this case, the painting gun and the door operating tool 7 are provided on the hand end of the painting robot.

REFERENCE SIGNS LIST

2: automobile body
3: conveyor apparatus
5: door opening and closing robot
6: robotic arm
7: door operating tool
8: control device
10: painting line
20: door
21: inner panel
22: outer panel
23: window groove
41: position controller
42: speed controller
43: current controller
60: base
61 to 63: link
66 to 68: drive unit
71: arm
72: insertion portion
73: restricting portion
80: controller
81: CPU
82: memory
A1: first axis
A2: second axis
D1 to D3: servo driver
E1 to EA: rotational position sensor
M1 to M3: servomotor

The invention claimed is:

1. A door opening and closing robot for opening and closing a door of an automobile body, the door opening and closing robot comprising:
 a door operating tool including an insertion portion and a restricting portion, the insertion portion being configured to be inserted in a window groove of the door, the restricting portion being configured to restrict movement of the insertion portion in an insertion direction toward the window groove by coming into contact with the door;
 a robotic arm that moves the door operating tool, the robotic arm including a plurality of connected links and drive units driving the respective links, the drive units including respective servomotors; and
 a control device that:
 stores, as a first reference position, a position of the door operating tool at which the insertion portion is inserted in the window groove and the restricting portion is in contact with an edge of the window groove or positioned above the edge of the window groove when the door is at an open position or a closed position;
 stores, as a first presence confirmation position, a position of the door operating tool that is away from the first reference position in the insertion direction;
 operates the robotic arm, such that the door operating tool moves to the first reference position and then moves from the first reference position toward the first presence confirmation position;
 obtains, as a first evaluation position, a position of the door operating tool after operating the robotic arm; and
 determines a deviation between the first presence confirmation position and the first evaluation position, and if the deviation is less than or equal to a predetermined first threshold, detects failed presence of the insertion portion in the window groove.

2. The door opening and closing robot according to claim 1, wherein
 after operating the robotic arm such that the door operating tool moves to the first reference position, but before operating the robotic arm such that the door operating tool moves from the first reference position toward the first presence confirmation position, the control device reduces pressing force applied from the door operating tool to the door.

3. The door opening and closing robot according to claim 1, wherein
 the control device:
 stores, as a second reference position, a position of the door operating tool at which the insertion portion is inserted in the window groove when the door is at the open position or the closed position;
 stores, as a second presence confirmation position, a position of the door operating tool that is horizontally away from the second reference position;
 operates the robotic arm such that the door operating tool moves to the second reference position and then moves from the second reference position toward the second presence confirmation position;
 obtains, as a second evaluation position, a position of the door operating tool after operating the robotic arm; and
 determines a deviation between the second presence confirmation position and the second evaluation position, and if the deviation is less than or equal to a predetermined second threshold, detects failed presence of the insertion portion in the window groove,
 when the door is at the open position, the second presence confirmation position is a position that is away from the second reference position in such a horizontal direction as to further open the door, and
 when the door is at the closed position, the second presence confirmation position is a position that is away from the second reference position in such a horizontal direction as to further close the door.

4. The door opening and closing robot according to claim 3, wherein
 after operating the robotic arm such that the door operating tool moves to the second reference position, but before operating the robotic arm such that the door operating tool moves from the second reference position toward the second presence confirmation position, the control device reduces pressing force applied from the door operating tool to the door.

5. A method of opening and closing a door of an automobile body by using a door opening and closing robot, the robot including: a door operating tool including an insertion portion and a restricting portion; and a robotic arm that moves the door operating tool, the method comprising:

storing, as a first reference position, a position of the door operating tool at which the insertion portion is inserted in a window groove of the door and the restricting portion is in contact with an edge of the window groove or positioned above the edge of the window groove when the door is at an open position or a closed position;

storing, as a first presence confirmation position, a position of the door operating tool that is away from the first reference position in a direction in which the insertion portion is inserted in the window groove;

operating the robotic arm, such that the door operating tool moves to the first reference position and then moves from the first reference position toward the first presence confirmation position;

obtaining, as a first evaluation position, a position of the door operating tool after operating the robotic arm; and determining a deviation between the first presence confirmation position and the first evaluation position, and if the deviation is less than or equal to a predetermined first threshold, detecting failed presence of the insertion portion in the window groove.

6. The method according to claim 5, comprising reducing pressing force applied from the door operating tool to the door after operating the robotic arm such that the door operating tool moves to the first reference position, but before operating the robotic arm such that the door operating tool moves from the first reference position toward the first presence confirmation position.

7. The method according to claim 5, further comprising:

storing, as a second reference position, a position of the door operating tool at which the insertion portion is inserted in the window groove when the door is at the open position or the closed position;

storing, as a second presence confirmation position, a position of the door operating tool that is horizontally away from the second reference position;

operating the robotic arm, such that the door operating tool moves to the second reference position and then moves from the second reference position toward the second presence confirmation position;

obtaining, as a second evaluation position, a position of the door operating tool after operating the robotic arm; and determining a deviation between the second presence confirmation position and the second evaluation position, and if the deviation is less than or equal to a predetermined second threshold, detecting failed presence of the insertion portion in the window groove, wherein when the door is at the open position, the second presence confirmation position is a position that is away from the second reference position in such a horizontal direction as to further open the door, and when the door is at the closed position, the second presence confirmation position is a position that is away from the second reference position in such a horizontal direction as to further close the door.

8. The method according to claim 7, comprising reducing pressing force applied from the door operating tool to the door after operating the robotic arm such that the door operating tool moves to the second reference position, but before operating the robotic arm such that the door operating tool moves from the second reference position toward the second presence confirmation position.

* * * * *